(12) United States Patent
Gokhale

(10) Patent No.: US 9,982,637 B2
(45) Date of Patent: May 29, 2018

(54) METHOD AND SYSTEM FOR ENGINE CONTROL

(71) Applicant: General Electric Company, Schenectady, NY (US)

(72) Inventor: Manoj Prakash Gokhale, Bangalore (IN)

(73) Assignee: General Electric Company, Schenectady, NY (US)

( * ) Notice: Subject to any disclaimer, the term of this patent is extended or adjusted under 35 U.S.C. 154(b) by 94 days.

(21) Appl. No.: 14/943,052

(22) Filed: Nov. 17, 2015

(65) Prior Publication Data

US 2017/0138317 A1    May 18, 2017

(51) Int. Cl.
| | |
|---|---|
| *F02D 23/02* | (2006.01) |
| *F02M 26/05* | (2016.01) |
| *F02D 41/40* | (2006.01) |
| *F02D 21/08* | (2006.01) |
| *F02D 41/00* | (2006.01) |
| *F02M 26/08* | (2016.01) |

(Continued)

(52) U.S. Cl.
CPC .......... *F02M 26/05* (2016.02); *F02B 37/001* (2013.01); *F02B 37/004* (2013.01); *F02B 37/007* (2013.01); *F02B 37/013* (2013.01); *F02D 21/08* (2013.01); *F02D 23/02* (2013.01); *F02D 41/0007* (2013.01); *F02D 41/0052* (2013.01); *F02D 41/401* (2013.01); *F02M 26/08* (2016.02); *F02B 29/0412* (2013.01); *F02D 41/08* (2013.01); *F02M 26/25* (2016.02); *F02M 2026/005* (2016.02)

(58) Field of Classification Search
CPC ... B61C 5/04; F01N 3/00; F01N 3/021; F01N 3/10; F01N 3/103; F01N 3/2053; F01N 2410/00; F01N 2410/10; F02B 37/00; F02B 37/12; F02B 37/20; F02B 39/16; F02B 37/013; F02D 41/0007; F02D 41/0055; F02D 41/0235; F02D 41/10; F02D 13/0269; F02D 2041/0265; F02D 2200/0414; F02D 2200/602; F02M 26/05; F02M 26/43; Y02T 10/142; Y02T 10/144; Y02T 10/20; Y02T 10/47

See application file for complete search history.

(56) References Cited

U.S. PATENT DOCUMENTS

| | | | |
|---|---|---|---|
| 6,283,096 B1* | 9/2001 | Kimura | F01L 9/02 123/305 |
| 2012/0304887 A1* | 12/2012 | Gokhale | B61O 5/04 105/62.1 |

(Continued)

*Primary Examiner* — Brandon Lee
(74) *Attorney, Agent, or Firm* — GE Global Patent Operation; John A. Kramer

(57) ABSTRACT

A system includes a controller that is configured to respond to engine load being at a designated engine load point by operating an engine with a lower exhaust gas recirculation (EGR) amount and a more advanced fuel injection timing than any other steady-state engine load point when EGR and fuel injection are enabled. The controller is further configured to respond to engine load being within a range of engine load points around the designated engine load point by increasing the EGR amount and retarding fuel injection timing as load increases and as load decreases away from the designated engine load point. This may result in decreased fuel consumption while maintaining emissions below designated levels.

14 Claims, 3 Drawing Sheets

(51) Int. Cl.
  *F02B 37/00*  (2006.01)
  *F02B 37/007* (2006.01)
  *F02B 37/013* (2006.01)
  *F02M 26/00*  (2016.01)
  *F02B 29/04*  (2006.01)
  *F02M 26/25*  (2016.01)
  *F02D 41/08*  (2006.01)

(56) References Cited

U.S. PATENT DOCUMENTS

2014/0047834 A1* 2/2014 Polkus .................... F02D 23/00
  60/602
2015/0089940 A1 4/2015 Sivasubramaniam et al.

* cited by examiner

METHOD AND SYSTEM FOR ENGINE CONTROL

BACKGROUND

Technical Field

Embodiments of the subject matter disclosed herein relate to engines and engine systems, for example.

Discussion of Art

A multi-cylinder engine may be operated to produce a relatively low amount of exhaust emissions. However, the reduction of exhaust emissions may create an increase in fuel consumption. Similarly, an engine may be operated to consume a relatively low amount of fuel, but such operation may cause an increase in exhaust emissions. Thus, balancing fuel efficiency with lowered exhaust emissions may prove difficult, particularly during certain modes of engine operation.

BRIEF DESCRIPTION

In an embodiment, a system (e.g., an engine control system) includes a controller that is configured to respond to an engine load of an engine being at a designated engine load point by operating the engine with a lower exhaust gas recirculation (EGR) amount and a more advanced fuel injection timing than any other steady-state engine load point when EGR and fuel injection are enabled. The controller is further configured to respond to engine load being within a range of engine load points around the designated engine load point by increasing the EGR amount and retarding fuel injection timing as load increases and as load decreases away from the designated engine load point.

DETAILED DESCRIPTION

The following description relates to embodiments of an engine system that may be used to generate motive power for propelling a vehicle, such as a marine vessel, rail vehicle, off-highway vehicle, or other suitable vehicle. The engine system may include a controller configured to respond to engine load being at a designated engine load point by operating the engine with a lower exhaust gas recirculation (EGR) amount and a more advanced fuel injection timing, relative to any other engine load point during steady-state conditions where EGR and fuel injection are enabled. The designated load point may be a load point at which the engine system most frequently operates. For example, when the engine system is installed in a marine vessel, the designated load point may be the load during cruising of the marine vessel. In some embodiments, the lower EGR amount may be a lowest EGR amount the engine is configured to operate with during steady state conditions when EGR is active, and the more advanced fuel injection timing may be a most advanced fuel injection timing the engine is configured to operate with during steady state conditions when fuel injection is active. By operating with the lowest EGR amount and most advanced fuel injection timing for steady-state conditions, fuel consumption at the designated load point may be reduced.

The controller may be further configured to maintain emissions over a range of engine load points around the designated engine load point by increasing the EGR amount and retarding fuel injection timing as load increases and as load decreases away from the designated engine load point.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a marine vessel is provided as an example of a mobile platform supporting a system incorporating an embodiment of the invention.

Figure 1:
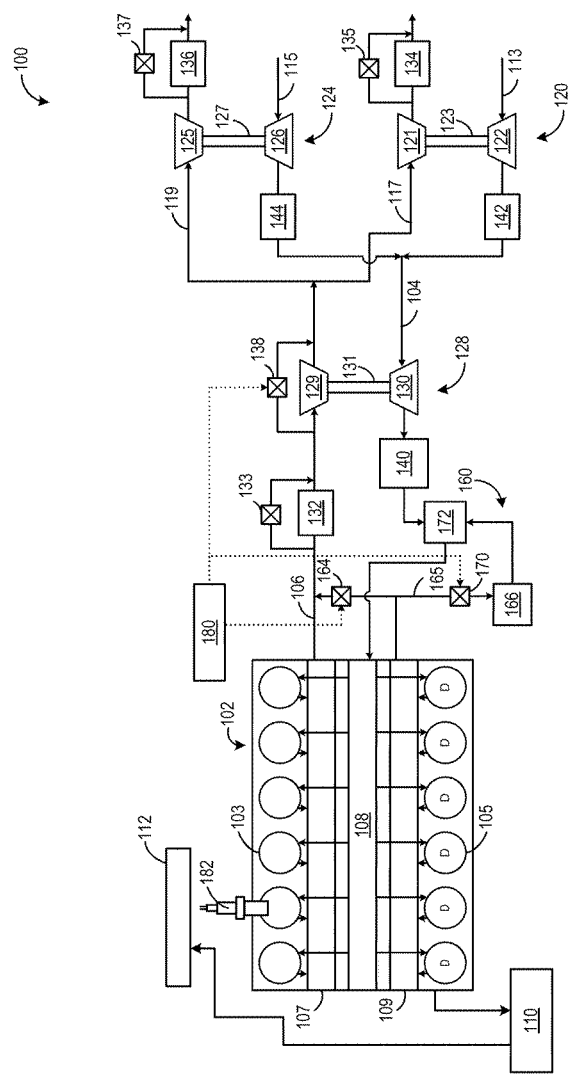
FIG. 1 shows a schematic diagram of an engine according to an embodiment of the invention.

Before further discussion of the approach for reducing fuel consumption while maintaining emissions, an example of a platform is disclosed in which the engine system may be installed in a vehicle, such as a marine vessel. For example, FIG. 1 shows a block diagram of an embodiment of a vehicle system 100 (e.g., a marine vehicle system). As depicted, the vehicle system includes an engine 102. In other non-limiting embodiments, the engine may be a stationary engine, such as in a power-plant application, or an engine in a rail vehicle or off-highway vehicle propulsion system as noted above.

The engine includes a plurality of cylinders. Each cylinder may include combustion chamber walls with a piston positioned therein. The pistons may be coupled to a crankshaft so that reciprocating motion of the pistons is translated into rotational motion of the crankshaft. In some embodiments, the engine may be a four-stroke engine in which each of the cylinders fires in a firing order during two revolutions of the crankshaft. In other embodiments, the engine may be a two-stroke engine in which each of the cylinders fires in a firing order during one revolution of the crankshaft.

The engine receives intake air for combustion from an intake, such as an intake manifold 108. The intake may be any suitable conduit or conduits through which gases flow to enter the engine. For example, the intake may include the intake manifold, an intake passage 104, and the like. The intake passage receives ambient air from an air filter (not shown) that filters air from outside of a vehicle in which the engine may be positioned. As illustrated, the intake passage 104 receives intake air from a split intake conduit including a first intake conduit 113 and a second intake conduit 115.

Exhaust gas resulting from combustion in the engine is supplied to an exhaust, such as exhaust passage 106. The exhaust may be any suitable conduit through which gases flow from the engine. For example, the exhaust may include an exhaust manifold 107, the exhaust passage, and the like. Exhaust gas flows through the exhaust passage, and out of one or more exhaust stacks of the vehicle. As illustrated, the exhaust passage 106 expels exhaust gas to a split exhaust conduit including a first exhaust conduit 117 and a second exhaust conduit 117, each exhaust conduit including an exhaust stack for releasing exhaust to atmosphere.

In some embodiments, each cylinder of the engine may include one or more intake valves and one or more exhaust valves and may be configured with one or more fuel injectors for providing fuel thereto. As a non-limiting example, FIG. 1 shows a fuel injector 182 for providing fuel to one cylinder of the engine; it is to be understood that each other cylinder includes a separate fuel injector. The fuel injector is shown coupled directly to the cylinder for injecting fuel directly therein. In this manner, fuel injector provides what is known as direct injection of a fuel into the cylinder. The fuel may be delivered to the fuel injector from a high-pressure fuel system including a fuel tank, fuel pumps, and a fuel rail (not shown). In one embodiment, the fuel is diesel fuel that is combusted in the engine through compression ignition. In other non-limiting embodiments, the fuel may be gasoline, kerosene, biodiesel, or other petroleum distillates of similar density combusted through compression ignition (and/or spark ignition). Further, in some embodiments the engine may be configured to operate with more than one type of fuel, such as diesel and natural gas.

The engine generates torque output that is transmitted to a rotating crankshaft (not shown) via a mechanical coupling. The rotating crankshaft may be mechanically coupled to a propeller with slow engine speeds, via a reduction gearbox (not shown) for medium and high speeds, or via an alternator and electric motor in diesel-electric vessels. The example vehicle illustrated in FIG. 1 is a diesel-electric vehicle. As depicted in FIG. 1, the engine is coupled to an electric power generation system, which includes an alternator/generator 110. For example, the engine may be a diesel engine that generates a torque output that is transmitted to the alternator/generator which is mechanically coupled to the engine. The alternator/generator produces electrical power that may be stored and applied for subsequent propagation to one or more loads 112. The loads may include the propeller and/or a variety of downstream electrical components. In another embodiment, alternator/generator may be coupled to one or more resistive grids. The resistive grids may be configured to dissipate excess engine torque via heat produced by the grids from electricity generated by alternator/generator.

In the embodiment depicted in FIG. 1, the engine is a V-12 engine having twelve cylinders. In other embodiments, the engine may be a V-6, V-8, V-10, V-16, I-4, I-6, I-8, opposed 4, or another engine type. As depicted, the engine may include a subset of non-donor cylinders 103, which includes six cylinders that supply exhaust gas exclusively to a non-donor cylinder exhaust manifold 107, and a subset of donor cylinders 105, which includes six cylinders that supply exhaust gas exclusively to a donor cylinder exhaust manifold 109. In other embodiments, the engine may include at least one donor cylinder and at least one non-donor cylinder. For example, the engine may have four donor cylinders and eight non-donor cylinders, or three donor cylinders and nine non-donor cylinders. It should be understood, the engine may have any desired numbers of donor cylinders and non-donor cylinders, with the number of donor cylinders typically lower than the number of non-donor cylinders. In yet another embodiment, the engine may not include any donor cylinders and instead include only non-donor cylinders. In another embodiment, exhaust gas recirculation (EGR) may be provided from a bank of cylinders supplying a manifold with exhaust and then this exhaust may be supplied to an air intake. In some embodiments, all cylinders of the engine may selectively provide EGR to an engine intake passage via an EGR system, as explained further below.

As depicted in FIG. 1, the non-donor cylinders are coupled to the exhaust passage to route exhaust gas from the engine to atmosphere (after it passes through optional emission control devices and first, second, and/or third turbochargers, explained below). The donor cylinders, which provide engine exhaust gas recirculation (EGR), are coupled to an EGR passage 165 of an EGR system 160 which routes exhaust gas from the donor cylinders to the intake passage of the engine. By introducing cooled exhaust gas to the engine, the amount of available oxygen for combustion is decreased, thereby reducing combustion flame temperatures and reducing the formation of nitrogen oxides (e.g., $NO_x$).

Exhaust gas flowing from the donor cylinders to the intake passage passes through a heat exchanger such as an EGR cooler 166 to reduce a temperature of (e.g., cool) the exhaust gas before the exhaust gas returns to the intake passage. The EGR cooler may be an air-to-liquid heat exchanger, for example. In such an embodiment, one or more charge air coolers 140, 142, and 144 disposed in the intake passage (e.g., upstream of where the recirculated exhaust gas enters) may be adjusted to further increase cooling of the charge air such that a mixture temperature of charge air and exhaust gas is maintained at a desired temperature. In other embodiments, the EGR system may include an EGR cooler bypass. Alternatively, the EGR system may include an EGR cooler control element. The EGR cooler control element may be actuated such that the flow of exhaust gas through the EGR cooler is reduced; however, in such a configuration, exhaust gas that does not flow through the EGR cooler is directed to the exhaust passage rather than the intake passage.

As shown in FIG. 1, the donor cylinders are coupled to an EGR passage 165 that is configured to selectively route exhaust to the intake or to the exhaust passage. For example, when a second valve 170 is open, exhaust may be routed from the donor cylinders to the EGR cooler and/or additional elements prior to being routed to the intake passage. Further, the EGR system includes a first valve 164 disposed between the exhaust passage and the EGR passage. While FIG. 1 illustrates the first valve as being positioned between the exhaust passage and the EGR passage, in some embodiments the first valve may be positioned between the EGR passage and the non-donor exhaust manifold, or between the donor cylinder exhaust manifold and the non-donor cylinder exhaust manifold. In each example, the first valve is operable to control an amount of exhaust from the donor cylinder group that travels to the exhaust system and eventually to atmosphere.

The first valve and second valve may be on/off valves controlled by the control unit 180 (for turning the flow of EGR on or off), or they may control a variable amount of EGR, for example. In some embodiments, the first valve may be actuated such that an EGR amount is reduced (exhaust gas flows from the EGR passage to the exhaust passage). In other embodiments, the first valve may be actuated such that the EGR amount is increased (e.g., exhaust gas flows from the exhaust passage to the EGR passage). In some embodiments, the EGR system may include a plurality of EGR valves or other flow control elements to control the amount of EGR.

In such a configuration, the first valve 164 is operable to route exhaust from the donor cylinders to the exhaust passage of the engine and the second valve 170 is operable to route exhaust from the donor cylinders to the intake passage of the engine. As such, the first valve may be referred to as an EGR bypass valve, while the second valve may be referred to as an EGR metering valve. In the embodiment shown in FIG. 1, the first valve and the second valve may be engine oil, or hydraulically, actuated valves, for example, with a shuttle valve (not shown) to modulate the engine oil. In some embodiments, the valves may be actuated such that one of the first and second valves is normally open and the other is normally closed. In other embodiments, the first and second valves may be pneumatic valves, electric valves, or another suitable valve.

As shown in FIG. 1, the vehicle system further includes an EGR mixer 172 which mixes the recirculated exhaust gas with charge air such that the exhaust gas may be evenly distributed within the charge air and exhaust gas mixture. In the embodiment depicted in FIG. 1, the EGR system is a high-pressure EGR system which routes exhaust gas from a location upstream of the turbochargers in the exhaust passage to a location downstream of the turbochargers in the intake passage. In other embodiments, the vehicle system may additionally or alternatively include a low-pressure EGR system which routes exhaust gas from downstream of the turbochargers in the exhaust passage to a location upstream of the turbochargers in the intake passage.

As depicted in FIG. 1, the vehicle system may further include a multi-stage turbocharger with a first turbocharger 120 arranged in parallel with a second turbocharger 124. The first and second turbochargers may be arranged in series with a third turbocharger 128. The multi-stage turbocharger increases air charge of ambient air drawn into the intake passage in order to provide greater charge density during combustion to increase power output and/or engine-operating efficiency. The first turbocharger operates at a relatively lower pressure, and includes a first turbine 121 positioned in exhaust conduit 117 which drives a first compressor 122 positioned in intake conduit 113. The first turbine and the first compressor are mechanically coupled via a first shaft 123. The first turbocharger may be referred to as a first "low-pressure stage" of the turbocharger. The second turbocharger also operates at a relatively lower pressure, and includes a second turbine 125 positioned in exhaust conduit 119 which drives a second compressor 126 positioned in intake conduit 115. The second turbocharger may also be referred to as a second "low-pressure stage" of the turbocharger. The second turbine and the second compressor are mechanically coupled via a second shaft 127.

The third turbocharger operates at a relatively higher pressure, and includes a third turbine 129 positioned in exhaust passage 106 which drives a third compressor 130 positioned in intake passage 104. The third turbocharger may be referred to as the "high-pressure stage" of the turbocharger. The third turbine and the third compressor are mechanically coupled via a third shaft 131.

As explained above, the terms "high pressure" and "low pressure" are relative, meaning that "high" pressure is a pressure higher than a "low" pressure. Conversely, a "low" pressure is a pressure lower than a "high" pressure.

As used herein, "multi-stage turbocharger" may generally refer to a multi-stage turbocharger configuration that includes two or more turbochargers. For example, a multi-stage turbocharger may include a high-pressure turbocharger and a low-pressure turbocharger arranged in series, three turbocharger arranged in series, two low pressure turbochargers feeding a high pressure turbocharger (as illustrated), one low pressure turbocharger feeding two high pressure turbochargers, etc. In one embodiment, three turbochargers are used in series. In another embodiment, only two turbochargers are used in series. In alternate embodiments, the engine system may only include a single stage turbocharger with only a single turbine and single compressor.

In the embodiment shown in FIG. 1, the third turbocharger is provided with a turbine bypass valve (TBV) 138 which allows exhaust gas to bypass the third turbocharger. The turbine bypass valve may be opened, for example, to divert the exhaust gas flow away from and around the third turbine. In this manner, the rotating speed of the third compressor, and thus the boost provided by the turbochargers to the engine may be regulated. For example, by increasing the opening of the TBV, the speed of the third turbine and thus the third compressor mechanically coupled with the third turbine may decrease, thereby decreasing boost provided to the engine. Decreasing boost may decrease an intake manifold pressure (MAP) of the engine.

Additionally, the first and/or second turbocharger may also be provided with a turbine bypass valve. In other embodiments, only the first turbocharger may be provided with a turbine bypass valve, or only the second turbocharger may be provided with a turbine bypass valve. Additionally, the third turbocharger may be provided with a compressor bypass valve, which allows gas to bypass the third compressor to avoid compressor surge, for example. In some embodiments, the first and/or second turbocharger may also be provided with a compressor bypass valve, while in other embodiments, only first turbocharger may be provided with a compressor bypass valve or only the second turbocharger may be provided with a compressor bypass valve.

The vehicle system further includes an exhaust treatment system coupled in the exhaust passage and/or exhaust conduits in order to reduce regulated emissions. As depicted in FIG. 1, a first emission control device 132 is disposed in exhaust passage 106 upstream of the third turbine of the third (high pressure) turbocharger. However, in some embodiments the first emission control device may alternatively be coupled downstream of the third turbine. A second emission control device 134 is disposed in first exhaust conduit 117 downstream of the first turbine of the first (low pressure) turbocharger. A third emission control device 136 is disposed in second exhaust conduit 119 downstream of the second turbine of the second (low pressure) turbocharger. Alternatively, in some embodiments one or both of the second and third emission control devices may be disposed upstream, rather than downstream, of the respective turbine. Further, in some embodiments one or more of the emission control devices may be dispensed with; for example, the second and third emission control devices may be dispensed with.

Each emission control device may include one or more components. For example, each emission control device may include one or more of a diesel particulate filter (DPF), a diesel oxidation catalyst (DOC), a selective catalytic reduction (SCR) catalyst, a three-way catalyst, a $NO_x$ trap, and/or various other emission control devices or combinations thereof. In the embodiment of FIG. 1, each emission control device may include only a DOC. In alternate embodiments, the vehicle system may not include the exhaust aftertreatment system.

Each emission control device may include a respective bypass passage controlled by a bypass valve. As shown, the first emission control device may include a first exhaust bypass valve 133, the second emission control device may include a second exhaust bypass valve 135, and the third emission control device may include a third exhaust bypass valve 137. The exhaust bypass valves may be referred to as DOC bypass valves when the respective emission control device is a DOC.

The vehicle system further includes the control unit 180, which is provided and configured to control various components related to the vehicle system. In one embodiment, the control unit includes a computer control system (e.g., referred to herein as a controller). The control unit further includes non-transitory, computer readable storage media (not shown) including code for enabling on-board monitoring and control of engine operation. The control unit, while overseeing control and management of the vehicle system, may be configured to receive signals from a variety of engine sensors, as further elaborated herein, in order to determine operating parameters and operating conditions, and correspondingly adjust various engine actuators to control operation of the vehicle system. For example, the control unit may receive signals from various engine sensors including one or more sensors arranged in the inlet of the high-pressure turbine, one or more sensors arranged in the inlet of each low-pressure turbine, sensors arranged in the inlet of the high- and/or low-pressure compressors, and an exhaust gas sensor arranged at the exhaust manifold, for example. The sensors arranged in the inlets of the turbochargers may detect air temperature and/or pressure.

In some embodiments, the engine may include a sensor for measuring peak cylinder pressure. Additional sensors may include, but are not limited to, engine speed, engine load, boost pressure, ambient pressure, exhaust temperature, exhaust pressure, etc. Correspondingly, the control unit may control the vehicle system by sending commands to various components such as the alternator, fuel injectors, cylinder valves, throttle, heat exchangers, wastegates/turbine bypass valves, EGR valves, DOC bypass valves, or other valves or flow control elements, etc. For example, the controller may send commands to an actuator of a fuel injector or exhaust valve of an individual cylinder, thereby adjusting operation of the individual cylinder based on the received command.

As explained above, various actions may be taken by the engine system in order to reduce fuel consumption, lower emissions, and/or provide requested engine power. For example, EGR amounts, fuel injection parameters such as timing, and TBV position may be adjusted depending on the engine operating mode and desired fuel economy and/or emissions. In one embodiment, described in more detail below, the EGR amount may be adjusted to a lowest EGR amount at a specific engine load point during steady-state operation, while the fuel injection timing may be adjusted to a most advanced fuel injection timing at the specific engine load point during steady-state operation, in order to reduce fuel consumption at the specific load point. Then, during operation outside the specific load point, the EGR amount and fuel injection timing may be adjusted, for example the EGR amount may be increased and the fuel injection timing may be retarded, as engine load increases or decreases away from the specific load point, in order to reduce emissions. In doing so, fuel consumption may be reduced during a desired load point, such as a load point the engine is most frequently operated at or at a load point that typically does not exhibit high emissions, while emissions may be maintained over the entire duty cycle of the engine.

Figure 2:
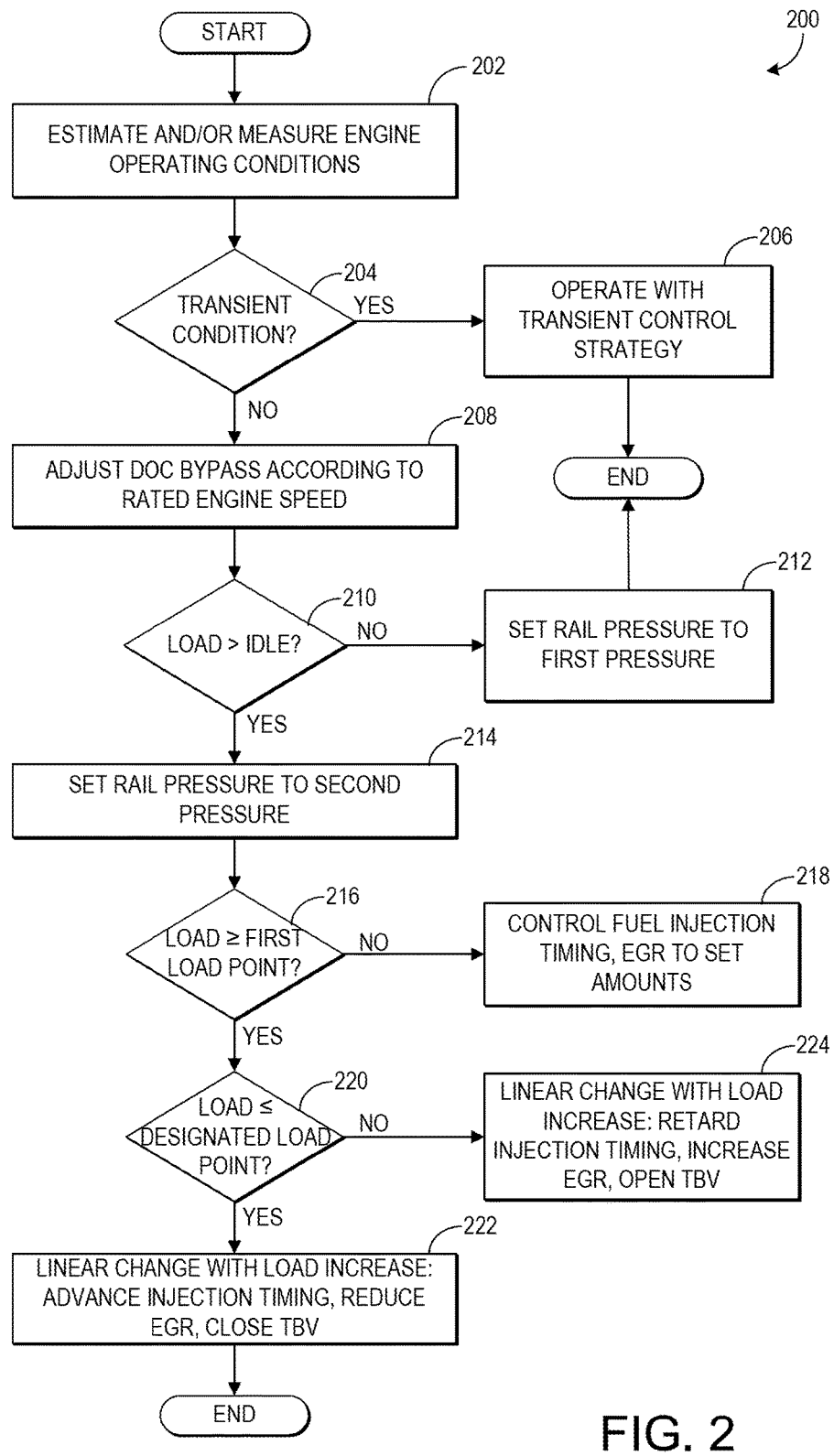
FIG. 2 is a flow chart illustrating an embodiment of a method for operating the engine of FIG. 1.

Turning to FIG. 2, a method 200 for operating an engine is illustrated. Method 200 may be carried out by a control unit, such as control unit 180 of FIG. 1, according to non-transitory instructions stored in memory of the control unit. Method 200 may adjust various actuators, such as one or more EGR valves (e.g., valves 164 and/or 170 of FIG. 1), turbine bypass valves (e.g., TBV 138), DOC bypass valves (e.g., valves 133, 135, and/or 137), and fuel injectors (e.g., fuel injector 182) in response to one or more sensed parameters, such as engine load.

At 202, method 200 includes estimating and/or measuring engine operating parameters. The estimated and/or measured engine operating parameters may include engine load (determined based on throttle position, engine airflow parameters, or other suitable mechanism), engine speed, current EGR amount, fuel injection timing, etc. At 204, method 200 includes determining if the engine is operating under a transient condition. A transient condition may include engine speed and/or load changing by a least a threshold amount. For example, a transient condition may be detected when an operator requests a load change (e.g., a notched throttle is moved from a first position to a second position), when load is currently increasing or decreasing, or other suitable mechanism.

If a transient condition is detected, method 200 proceeds to 206 to operate the engine with a transient control strategy. In one embodiment, the transient control strategy may include opening the turbine bypass valve (if it is closed) and adjusting the EGR amount based on designated intake oxygen concentration and designated intake mass flow. During a transient condition, the EGR amount may be relatively low, and in some embodiments may be lower than EGR amounts provided during non-transient conditions. Further, during a transient condition, the fuel injection timing may be relatively advanced, and in some embodiments may be more advanced that fuel injection timing during non-transient conditions.

If a transient condition is not detected, method 200 proceeds to 208 to adjust one or more DOC bypass valves according to rated engine speed. In one embodiment, if the rated speed of the engine is less than a threshold, such as 1000 RPM, the one or more DOC bypass valve may be open during all operating conditions to allow exhaust to bypass each DOC in the exhaust system. If the rated engine speed is equal to or greater than the threshold, the one or more DOC bypass valves may be closed, at least during some operating modes, to force exhaust to travel through each DOC in the exhaust system.

At 210, method 200 includes determining if engine load is greater than idle engine load. In one embodiment, idle engine load may include engine loads below 25% of maximum rated load. If load is not greater than idle, method 200 proceeds to 212 to set the fuel rail pressure to a first pressure, and then method 200 returns. Further, in some embodiments, the turbine bypass valve may be maintained closed, EGR may be disabled during the very low loads that are experienced during idle load conditions, and/or fuel injection timing may be maintained at an idle fuel injection timing (which in some embodiments may include a fuel injection timing that is equal to fuel injection timing at loads equal to 25%, explained below).

If it is determined at 210 that load is greater than idle, method 200 proceeds to 214 to set the fuel rail pressure to a second pressure. The second fuel rail pressure may be greater than the first fuel rail pressure. In one non-limiting embodiment, the first rail pressure may be 1800 bar while the second rail pressure may be 2200 bar. The rail pressure may be controlled by adjusting a high pressure fuel pump, inlet metering valve position, or other suitable mechanism.

At 216, method 200 determines if the engine load is greater than or equal to a first load point. The first load point may be a lower load point in a range of load points during which EGR amounts and fuel injection timing may be adjusted linearly with load. In one embodiment, the first load point may be a load of 75% of maximum rated load. If engine load is not greater than the first load point, method 200 proceeds to 218 to control fuel injection timing to a set timing and EGR to a set EGR amount. The set EGR amount and set fuel injection timing may not vary based on engine load, or may vary by a small amount (e.g., vary by less than a threshold, such as less than 1%) as load changes. In one embodiment, the EGR amount may be adjusted to provide a designated intake oxygen concentration during operation with engine load less than the first load point. The EGR amount may be controlled by adjusting one or more valves (e.g., valve 164 and/or 170) and the fuel injection timing may be controlled by adjusting when one or more fuel injectors are actuated. Additionally, during loads less than the first load point (but greater than idle load), the turbine bypass valve may be maintained in the fully closed position such that all exhaust gas travels through the turbine (e.g., the third turbine of FIG. 1). Method 200 then returns.

If it is determined at 216 that load is greater than or equal to the first load point, method 200 proceeds to 220 to determine if load is less than or equal to a designated load point. As explained above, the designated load may represent a specific load point at which it is desired to reduce specific fuel consumption. In order to achieve the lowered fuel consumption, without compromising emissions, a linear change in EGR and fuel injection timing is executed within a range of load points surrounding the designated load point. In one embodiment, the designated load point is greater than the first load point, and may be 85% load or other suitable load, such as 80%.

Accordingly, if it is determined that the current engine load is less than or equal to the designated load point, the engine is operating with a load greater than (or equal to) the first load point yet less than or equal to the designated load point, and thus method 200 proceeds to 222. At 222, a linear change with load increase toward the designated load point (or with load decrease away from the designated load point) is performed. This includes advancing fuel injection timing and reducing the EGR amount based on engine load, where the fuel injection is advanced and EGR is reduced as load gets closer to the designated load point. If the load is equal to the designated load point, the engine is operated with a most advanced fuel injection timing for steady-state conditions and a lowest amount of EGR for steady-state conditions that the engine is configured to operate with, while EGR and fuel injection are enabled during steady-state (e.g., non-transient conditions). That is, the engine is not configured to operate with an EGR amount lower than the lowest amount of EGR (other than zero EGR when EGR is deactivated) or a fuel injection timing more advanced than the most advanced timing during steady-state conditions, though in some embodiments the engine may operate with lower EGR and/or more advanced fuel injection timing during transient conditions. This most advanced fuel injection timing and lowest amount of EGR may represent the advancement of fuel injection timing and decrease in EGR that results in the highest reduction of fuel consumption possible, while maintaining emissions (e.g., NOx) under a designated limit. Further, during the load points between the first load point and designated load point, the turbine bypass valve is maintained fully closed to route all exhaust through the third turbine. Additionally, for engines with a higher rated speed (e.g., equal to or higher than the threshold rated speed described above), the one or more DOC bypass valves may be opened, to further decrease fuel consumption. Method 200 then returns.

On the other hand, if it is determined at 220 that the engine is not operating with load less than or equal to the designated load, the engine is thus operating at a load greater than the designated load, and method 200 proceeds to 224 to perform a linear load change with load increase away from the designated load point (or with load decrease toward the designated load point). This includes retarding fuel injection timing and increasing the EGR amount based on engine load, where the fuel injection is retarded and the EGR is reduced as load gets further away from the designated load point. As explained above, at the designated load point, the engine is operated with a most advanced fuel injection timing and a lowest amount of EGR that the engine is configured to operate with, while EGR and fuel injection are enabled, and the injection timing is retarded relative to the most advanced fuel injection timing and the EGR is increased relative to the lowest amount of EGR, in order to reduce emissions. Further, during the load points greater than the designated load point, the turbine bypass valve is opened (either fully opened or partially opened) to route at least some exhaust around the third turbine. Additionally, for engines with a higher rated speed (e.g., equal to or higher than the threshold rated speed described above), the one or more DOC bypass valves may be closed, to further reduce emissions. Method 200 then returns.

Thus, method 200 identifies a designated engine load point and range of engine load points surrounding the designated load point and performs a linear adjustment of EGR amounts and fuel injection timing while operating within the range of engine load points surrounding the designated load point. The designated load point may represent a load point where it is desired to lower fuel consumption. While method 200 describes engine load with respect to specific load points, it is to be understood that the same engine control mechanism may be applied to other engine load parameters, such as lines, curves, or envelopes. (Thus, being within a range of engine load points around a designated engine load point includes the range being defined in terms of discrete point(s) or by a line, curve, envelope, etc.). For example, the designated load point may represent a range of loads (e.g., 84-86%) rather than a single load point. Further, method 200 includes adjustments to fuel injection timing in order to adjust fuel consumption at the designated engine load point. However, in some embodiments, alternative or additional fuel injection parameters may be adjusted, such as pulse duration, pulse timings (if fuel is injected in multiple, split injection events, the timing of one or more of the injection events may be adjusted), etc. If the engine is configured to operate with more than one type of fuel, the fuel injection event parameters for one or both of the fuels may be adjusted. For example, if the engine is configured to operate with diesel fuel and natural gas, the fuel injection timing of the diesel fuel may be adjusted while the fuel injection timing of the natural gas fuel may be maintained at a constant timing.

Additionally, while method 200 includes specific EGR amount and fuel injection timing adjustments while in the range of engine load points surrounding the designated load point, it is to be understood that certain other conditions may override and/or contribute to the EGR amount and fuel injection timing adjustments in addition to engine load. For example, the engine may still operate within oxygen-fuel ratio (OFR) and/or peak cylinder pressure limits, and thus the EGR amount and/or fuel injection timing may be further adjusted during operation within the range of engine loads to maintain engine operation under the peak cylinder pressure and/or within the OFR limits. For example, certain operating conditions may reduce intake air oxygen concentration, such as tunnel operation, operation at high altitudes, etc. During these conditions, the amount the EGR is lowered at the designated load point may be less than when operating at higher intake air oxygen concentrations, to maintain combustion stability.

Figure 3:
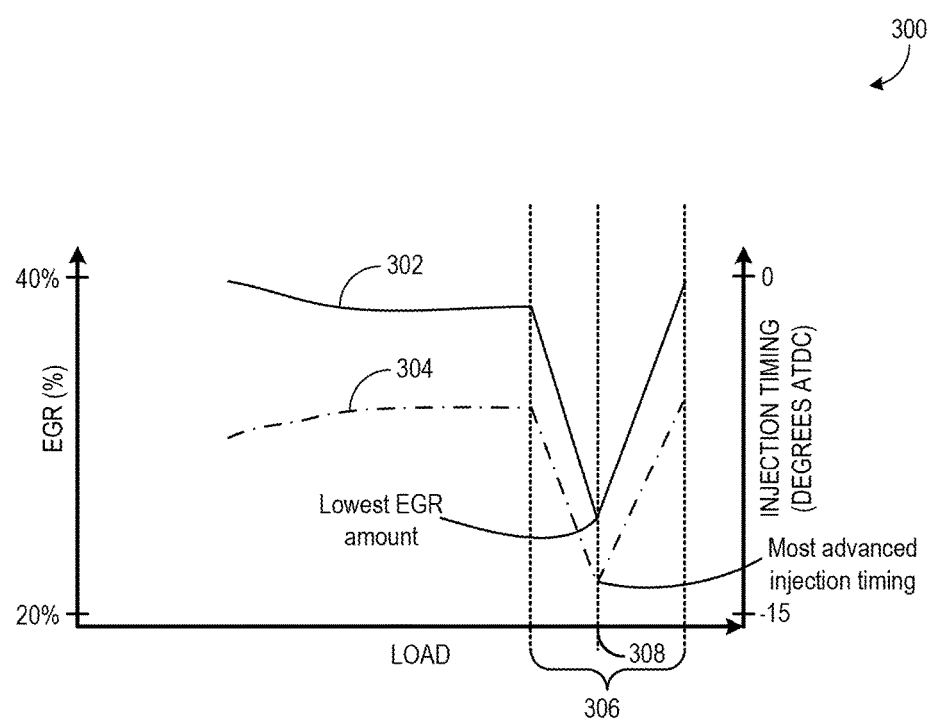
FIG. 3 is a diagram illustrating examples of parameters of interest during the execution of the method of FIG. 2.

FIG. 3 is a diagram 300 illustrating EGR amounts and fuel injection timing as a function of engine load. Engine load is plotted on the x- (horizontal) axis, with load increasing from a minimum load (e.g., zero) to a maximum load (100% rated load) from left to right. EGR amount (represented as percentage of mass flow of the charge air into the cylinders) is plotted on a first, left y- (vertical axis), with EGR % increasing from bottom to top (e.g., 20%-40%). Fuel injection timing (in degrees after top dead center (ATDC)) is plotted on a second, right y- (vertical) axis, with fuel injection timing advancing from TDC at the top to less than TDC (e.g., −15°) at the bottom. EGR is illustrated by solid curve 302, while fuel injection timing is illustrated by dashed-dotted curve 304.

As illustrated by diagram 300, EGR and fuel injection timing are maintained within a threshold of a respective set EGR amount and set fuel injection timing for all loads until the load range 306 surrounding the designated load point 308. Once the first load point is reached within the range 306, EGR is decreased linearly with load toward the designated load point 308 and fuel injection timing is advanced linearly with load toward the designated load point 308. At the designated load point 308, fuel injection timing is at the most advanced timing for steady-state conditions and EGR is at the lowest EGR amount for steady-state conditions (other than when EGR and/or fuel injection are disabled). As load increases away from the designated load point 308, EGR is increased and fuel injection timing is retarded, away from the lowest EGR amount and most advanced fuel injection timing.

Thus, the systems and methods described above provide for an embodiment of a controller configured to respond to engine load being at a designated engine load point by operating an engine with a lower exhaust gas recirculation (EGR) amount and a more advanced fuel injection timing, the controller further configured to respond to engine load being within a range of engine load points around the designated engine load point by increasing the EGR amount and retarding fuel injection timing as load increases and as load decreases away from the designated engine load point. In embodiments, the lower EGR amount is lower than all other EGR amounts provided during all other steady-state load points, other than when EGR is disabled (e.g., at loads lower than 25%). The more advanced fuel injection timing is more advanced than all other fuel injection timings during all other steady-state load points, other than when fuel injection is disabled.

In an embodiment, the controller is configured to respond to engine load being within the range of engine load points around the designated engine load point by increasing the EGR amount by an amount based on engine load. In an embodiment, the controller is configured to respond to engine load being within the range of engine load points around the designated engine load point by retarding the fuel injection timing by an amount based on engine load. In embodiments, the controller is configured to respond to engine load being outside the range of engine load points by controlling the EGR amount to be within a threshold of a designated EGR amount, and controlling fuel injection timing to be within a threshold of a designated fuel injection timing. In embodiments, the designated EGR amount is based on a designated intake oxygen concentration. In embodiments, the controller is further configured to respond to engine load being at the designated engine load point by bypassing exhaust flow around an emission control device. In embodiments, the controller is further configured to respond to engine load being at the designated engine load point by closing a turbine bypass valve coupled around a turbine of a turbocharger. In embodiments, the controller is further configured to respond to a requested change in engine load by opening the turbine bypass valve and adjusting the EGR amount based on designated intake oxygen concentration and designated intake mass flow. The requested change in engine load may constitute a transient operating condition. In embodiments, the lower EGR amount is a lowest amount of EGR the engine is commanded to operate with, at steady-state conditions when EGR is enabled. Likewise, the more advanced fuel injection timing is the most advanced fuel injection timing the engine is commanded to operate with, at steady state conditions when fuel injection is enabled.

An embodiment of a method is provided, comprising, during steady-state engine operation in a first range of engine load points, maintaining an exhaust gas recirculation (EGR) amount within a threshold of a designated EGR amount, and maintaining fuel injection timing within a threshold of a designated fuel injection timing; and during steady-state engine operation in a second, higher range of engine load points, decreasing the EGR amount relative to the designated EGR amount as a function of load, and advancing injection timing relative to the designated fuel injection timing as a function of load, where the second range of engine load points includes a designated engine load point where the EGR amount is a lowest EGR amount and the fuel injection timing is a most advanced fuel injection timing.

In embodiments, the method further comprises, during steady-state engine operation in a third range of engine load points, higher than the first range and the second range, increasing the EGR amount relative to the lowest EGR amount as a function of load and retarding fuel injection timing relative to the most advanced fuel injection timing as a function of load. The first range of load points may include all engine loads from idle engine load up to a first engine load point (e.g., 25-75% load), the second range of load points may include all engine loads from the first engine load point to a designated load point (e.g., 75-85% load), and the third range of load points may include all engine loads from the designated load point to a maximum rated load of the engine (e.g., 85-100%).

In embodiments, the method further comprises flowing exhaust gas through an emission control device during the engine operation in the first range and the third range of engine load points, and bypassing exhaust gas around the emission control device during the engine operation in the second range of engine load points. In embodiments, the method further comprises opening a turbine bypass valve during the engine operation in the third range of engine load points, and closing the turbine bypass valve during the engine operation in one or more of the first or the second range of engine load points.

An embodiment of a system includes an engine coupled to an exhaust system and to an intake system; an exhaust gas recirculation (EGR) system configured to route exhaust gas to the intake system; one or more EGR valves to control exhaust gas flow through the EGR system; and a controller. The controller is configured to: identify a designated engine load point; during operation with engine load below a first engine load point, control fuel injection timing to a set fuel injection timing and adjust the one or more EGR valves to provide a set EGR amount; responsive to engine load being in a range from the first engine load point to the designated engine load point, advance fuel injection timing relative to the set timing and adjust the one or more EGR valves to reduce the EGR amount relative to the set EGR amount; and responsive to engine load being greater than the designated engine load point, retard fuel injection timing relative to the advanced fuel injection timing and adjust the one or more EGR valves to increase the EGR amount relative to the reduced EGR amount.

In embodiments, the engine includes a first cylinder group coupled to a first exhaust manifold and a second cylinder group coupled to a second exhaust manifold, the first exhaust manifold coupled to the EGR system and the second exhaust manifold coupled to a turbine of a high-pressure turbocharger. In embodiments, the one or more EGR valves comprises a first EGR valve positioned between the first exhaust manifold and the intake system and a second EGR valve positioned between the first exhaust manifold and the second exhaust manifold. In embodiments, the system further comprises a first, high pressure turbocharger; a second, low pressure turbocharger; a turbine bypass valve coupled across a turbine of the first turbocharger; an emission control device positioned in the exhaust system upstream of the first turbocharger; and an emission control device bypass valve coupled across the emission control device. In embodiments, the controller is further configured to, during operation with engine load below the designated engine load point, maintain the turbine bypass valve fully closed, and responsive to engine load being greater than the designated engine load point, open the turbine bypass valve. In embodiments, the controller is further configured to, during operation with engine load below the first engine load point, maintain the emission control device bypass valve fully closed; responsive to engine load being in the range from the first engine load point to the designated engine load point, open the emission control device bypass valve; and responsive to engine load being greater than the designated engine load point, close the emission control device bypass valve.

In embodiments, the first turbocharger and second turbocharger are positioned in series, the emission control device is a first emission control device, and the emission control device bypass valve is a first emission control device bypass valve. The system further comprises a third, low pressure turbocharger positioned in parallel with the second turbocharger; a second emission control device positioned in the exhaust system downstream of the second turbocharger; a third emission control device positioned in the exhaust system downstream of the third turbocharger; a second emission control device bypass valve coupled across the second emission control device; and a third emission control device bypass valve coupled across the third emission control device.

An embodiment relates to a method including responsive to engine load being at a designated engine load point, operating an engine with a lower exhaust gas recirculation (EGR) amount and a more advanced fuel injection timing than any other steady-state engine load point when EGR and fuel injection are enabled, and responsive to engine load being within a range of engine load points around the designated engine load point, increasing the EGR amount and retarding fuel injection timing as load increases and as load decreases away from the designated engine load point. In some embodiments, the lower EGR amount is a lowest amount of EGR the engine is commanded to operate with when the engine is operating at steady-state conditions, and the more advanced fuel injection timing is a most advanced fuel injection timing the engine is commanded to operate with when the engine is operating at steady-state conditions.

In an embodiment, increasing the EGR amount responsive to engine load being within a range of engine load points around the designated engine load point includes increasing the EGR amount by an amount based on the engine load, and retarding the fuel injection timing responsive to engine load being within a range of engine load points around the designated engine load point includes retarding fuel injection timing by an amount based on the engine load. In an embodiment, the method further includes responsive to engine load being outside the range of engine load points, controlling the EGR amount to be within a threshold of a designated EGR amount, and controlling fuel injection timing to be within a threshold of a designated fuel injection timing. In an embodiment, the designated EGR amount is based on a designated intake oxygen concentration. In an embodiment, the method further includes, responsive to engine load being at a designated engine load point, bypassing exhaust flow around an emission control device and/or closing a turbine bypass valve coupled around a turbine of a turbocharger. In an embodiment, the method further includes responsive to a requested change in engine load, opening the turbine bypass valve and adjusting the EGR amount based on designated intake oxygen concentration and designated intake mass flow.

Another embodiment relates to a system. The system includes an engine coupled to an exhaust system and to an intake system, an exhaust gas recirculation (EGR) system configured to route exhaust gas to the intake system, one or more EGR valves to control exhaust gas flow through the EGR system, and a controller. The controller is configured to, during engine operation in a first range of engine load points, maintain an exhaust gas recirculation (EGR) amount within a threshold of a designated EGR amount, and maintain fuel injection timing within a threshold of a designated fuel injection timing. The controller is further configured to, during engine operation in a second, higher range of engine load points, decrease the EGR amount relative to the designated EGR amount as a function of load, and advance injection timing relative to the designated fuel injection timing as a function of load, where the second range of engine load points includes a designated engine load point where the EGR amount is a lowest EGR amount and the fuel injection timing is a most advanced fuel injection timing.

The controller may be further configured to, during engine operation in a third range of engine load points, higher than the first range and the second range, increase the EGR amount relative to the lowest EGR amount as a function of load and retard fuel injection timing relative to the most advanced fuel injection timing as a function of load. The system may further include an emission control device coupled downstream of the engine, and the controller may be configured to flow exhaust gas through the emission control device during the engine operation in the first range and the third range of engine load points, and bypass exhaust gas around the emission control device during the engine operation in the second range of engine load points. The system may further include a turbocharger having a turbine controlled by a turbine bypass valve, and the controller may be further configured to open the turbine bypass valve during the engine operation in the third range of engine load points, and close the turbine bypass valve during the engine operation in the second range of engine load points.

An embodiment for an engine includes identifying a designated engine load point, during operation with engine load below a first engine load point, controlling fuel injection timing to a set fuel injection timing and adjusting the one or more EGR valves to provide a set EGR amount, responsive to engine load being in a range from the first engine load point to the designated engine load point, advancing fuel injection timing relative to the set timing and adjusting the one or more exhaust valves to reduce the EGR amount relative to the set EGR amount, and responsive to engine load being greater than the designated engine load point, retarding fuel injection timing relative to the advanced fuel injection timing and adjusting the one or more EGR valves to increase the EGR amount relative to the reduced EGR amount.

The method may further include, during operation with engine load below the designated engine load point, maintaining a turbine bypass valve coupled across a turbine fully closed, and responsive to engine load being greater than the designated engine load point, opening the turbine bypass valve. The method may further include, during operation with engine load below the first engine load point, maintaining an emission control device bypass valve coupled across an emission control device fully closed, responsive to engine load being in the range from the first engine load point to the designated engine load point, opening the emission control device bypass valve, and responsive to engine load being greater than the designated engine load point, closing the emission control device bypass valve.

As used herein, an element or step recited in the singular and proceeded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
an engine coupled to an exhaust system and to an intake system;
an exhaust gas recirculation (EGR) system configured to route exhaust gas to the intake system;
one or more EGR valves to control exhaust gas flow through the EGR system;
a first, high pressure turbocharger;
a second, low pressure turbocharger positioned in series with the first turbocharger;
a turbine bypass valve coupled across a turbine of the first turbocharger;
a first emission control device positioned in the exhaust system upstream of the first turbocharger;
a first emission control device bypass valve coupled across the first emission control device;
a third, low pressure turbocharger positioned in parallel with the second turbocharger;
a second emission control device positioned in the exhaust system downstream of the second turbocharger;
a third emission control device positioned in the exhaust system downstream of the third turbocharger;
a second emission control device bypass valve coupled across the second emission control device; and
a third emission control device bypass valve coupled across the third emission control device; and
a controller configured to:
identify a designated engine load point;
during operation with engine load below a first engine load point, control fuel injection timing to a set fuel injection timing and adjust the one or more EGR valves to provide a set EGR amount;
responsive to engine load being in a range from the first engine load point to the designated engine load point, advance fuel injection timing relative to the set timing and adjust the one or more EGR valves to reduce an EGR amount relative to the set EGR amount; and
responsive to engine load being greater than the designated engine load point, retard fuel injection timing relative to the advanced fuel injection timing and adjust the one or more EGR valves to increase the EGR amount relative to the reduced EGR amount.

2. The system of claim 1, wherein the engine includes a first cylinder group coupled to a first exhaust manifold and a second cylinder group coupled to a second exhaust manifold, the first exhaust manifold coupled to the EGR system and the second exhaust manifold coupled to a turbine of the first, high pressure turbocharger.

3. The system of claim 2, wherein the one or more EGR valves comprises a first EGR valve positioned between the first exhaust manifold and the intake system and a second EGR valve positioned between the first exhaust manifold and the second exhaust manifold.

4. The system of claim 1, wherein the controller is further configured to, during operation with engine load below the designated engine load point, maintain the turbine bypass valve fully closed, and responsive to engine load being greater than the designated engine load point, open the turbine bypass valve.

5. The system of claim 1, wherein the controller is further configured to:

during operation with engine load below the first engine load point, maintain the first emission control device bypass valve fully closed;

responsive to engine load being in the range from the first engine load point to the designated engine load point, open the first emission control device bypass valve; and responsive to engine load being greater than the designated engine load point, close the first emission control device bypass valve.

6. The system of claim 5, wherein the system is installed in a marine vessel.

7. The system of claim 1, wherein each of the first emission control device, the second emission control device, and the third emission control device comprises a respective diesel oxidation catalyst.

8. The system of claim 7, wherein the system is installed in a marine vessel.

9. The system of claim 1, wherein the first emission control device, the second emission control device, and the third emission control device comprise one or more diesel particulate filters, one or more diesel oxidation catalysts, one or more selective catalytic reduction catalysts, one or more three-way catalysts, or one or more NOx traps.

10. The system of claim 9, wherein the system is installed in a marine vessel.

11. The system of claim 1, wherein the system is installed in a marine vessel.

12. The system of claim 2, wherein the system is installed in a marine vessel.

13. The system of claim 3, wherein the system is installed in a marine vessel.

14. The system of claim 4, wherein the system is installed in a marine vessel.

* * * * *